(12) United States Patent
Chun et al.

(10) Patent No.: US 8,971,288 B2
(45) Date of Patent: Mar. 3, 2015

(54) METHOD OF SUPPORTING HANDOVER IN A WIRELESS COMMUNICATION SYSTEM

(75) Inventors: Sung Duck Chun, Anyang-si (KR); Young Dae Lee, Hanam-si (KR); Sung Jun Park, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 629 days.

(21) Appl. No.: 12/293,803

(22) PCT Filed: Mar. 22, 2007

(86) PCT No.: PCT/KR2007/001399
§ 371 (c)(1),
(2), (4) Date: May 17, 2010

(87) PCT Pub. No.: WO2007/108655
PCT Pub. Date: Sep. 27, 2007

(65) Prior Publication Data
US 2010/0227614 A1    Sep. 9, 2010

Related U.S. Application Data

(60) Provisional application No. 60/784,976, filed on Mar. 22, 2006, provisional application No. 60/797,402, filed on May 2, 2006.

(30) Foreign Application Priority Data

Jan. 10, 2007 (KR) .................. 10-2007-0002962

(51) Int. Cl.
*H04W 4/00* (2009.01)
*H04W 36/00* (2009.01)
(Continued)

(52) U.S. Cl.
CPC ............. *H04W 36/02* (2013.01); *H04L 1/1854* (2013.01); *H04L 47/193* (2013.01)

USPC .......................................... 370/331

(58) Field of Classification Search
USPC ................................. 370/331, 332
See application file for complete search history.

(56) References Cited

U.S. PATENT DOCUMENTS 5,659,756 A    8/1997 Hefferon et al.
5,754,754 A    5/1998 Dudley et al.
(Continued)

FOREIGN PATENT DOCUMENTS

CN    1104402    6/1995
CN    1267146    9/2000
(Continued)

OTHER PUBLICATIONS

Huawei, "Further Considerations on Multiplexing Method of Shared Control Channel in Uplink Single-Carrier FDMA," 3GPP TSG-RAN WG1, R1-051430 [online], Nov. 7, 2005. Retrieved from the Internet on Jul. 24, 2008: <http://www.3gpp.org/ftp/TSG_RAN/WG1_RL1/TSGR1_43/Docs/R1-051430.zip>.

(Continued)

*Primary Examiner* — Chirag Shah
*Assistant Examiner* — Majid Esmaeilian
(74) *Attorney, Agent, or Firm* — Lee, Hong, Degerman, Kang & Waimey

(57) ABSTRACT

Disclosed are methods of performing handover and supporting thereof in a mobile communication system. The method of supporting handover at a first network entity in a mobile communication system comprises transmitting a plurality of data blocks of a first layer to a user equipment (UE), checking whether each of the plurality of data blocks is successfully transmitted to the user equipment (UE), and transmitting to a second network entity at least one data block of the first layer excluding a data block which is successfully transmitted to the user equipment (UE) among the plurality of data blocks of the first layer, the second network entity being a target network entity for handover of the user equipment (UE).

6 Claims, 7 Drawing Sheets

(51) Int. Cl.
*H04W 36/02* (2009.01)
*H04L 1/18* (2006.01)
*H04L 12/801* (2013.01)

(56) References Cited

U.S. PATENT DOCUMENTS

| | | | |
|---|---|---|---|
| 5,828,677 | A | 10/1998 | Sayeed et al. |
| 6,088,342 | A | 7/2000 | Cheng et al. |
| 6,138,158 | A | 10/2000 | Boyle et al. |
| 6,317,430 | B1 | 11/2001 | Knisely et al. |
| 6,330,448 | B1 | 12/2001 | Otsuka et al. |
| 6,381,229 | B1 | 4/2002 | Narvinger et al. |
| 6,421,540 | B1 | 7/2002 | Gilhousen et al. |
| 6,480,525 | B1 | 11/2002 | Parsa et al. |
| 6,571,102 | B1 | 5/2003 | Hogberg et al. |
| 6,597,668 | B1 | 7/2003 | Schafer et al. |
| 6,597,675 | B1 | 7/2003 | Esmailzadeh et al. |
| 6,694,148 | B1 | 2/2004 | Frodigh et al. |
| 6,717,925 | B1 | 4/2004 | Leppisaari et al. |
| 6,728,225 | B1 | 4/2004 | Ozluturk |
| 6,785,510 | B2 | 8/2004 | Larsen |
| 6,791,963 | B1 | 9/2004 | Hwang et al. |
| 6,795,412 | B1 | 9/2004 | Lee |
| 6,850,504 | B1 | 2/2005 | Cao et al. |
| 6,859,445 | B1 | 2/2005 | Moon et al. |
| 6,882,727 | B1 | 4/2005 | Vialen et al. |
| 6,907,005 | B1 | 6/2005 | Dahlman et al. |
| 6,907,015 | B1 | 6/2005 | Moulsley et al. |
| 6,934,550 | B2 | 8/2005 | Kearney et al. |
| 6,947,394 | B1 | 9/2005 | Johansson et al. |
| 6,950,420 | B2 | 9/2005 | Sarkkinen et al. |
| 6,965,580 | B1 | 11/2005 | Takagi et al. |
| 7,016,343 | B1 | 3/2006 | Mermel et al. |
| 7,031,708 | B2 | 4/2006 | Sarkkinen et al. |
| 7,054,289 | B1 | 5/2006 | Foster, Jr. et al. |
| 7,075,971 | B2 | 7/2006 | Parsa et al. |
| 7,099,309 | B2 | 8/2006 | Davidson |
| 7,145,895 | B2 | 12/2006 | Mueckenheim et al. |
| 7,151,758 | B2 | 12/2006 | Kumaki et al. |
| RE39,454 | E | 1/2007 | Cantoni et al. |
| 7,184,792 | B2 | 2/2007 | Mir |
| 7,239,870 | B2 | 7/2007 | Zhang et al. |
| 7,359,345 | B2 | 4/2008 | Chang et al. |
| 7,359,349 | B2 | 4/2008 | Kayama et al. |
| 7,376,424 | B2 | 5/2008 | Kim et al. |
| 7,385,952 | B2 | 6/2008 | Mantha et al. |
| 7,398,108 | B2 | 7/2008 | Hondo |
| 7,426,175 | B2 | 9/2008 | Zhuang et al. |
| 7,430,206 | B2 | 9/2008 | Terry et al. |
| 7,436,801 | B1 | 10/2008 | Kanterakis |
| 7,443,816 | B2 | 10/2008 | Chen et al. |
| 7,496,113 | B2 | 2/2009 | Cai et al. |
| 7,535,886 | B2 | 5/2009 | Lee et al. |
| 7,590,089 | B2 | 9/2009 | Park et al. |
| 7,664,059 | B2 | 2/2010 | Jiang |
| 7,673,211 | B2 | 3/2010 | Meyer et al. |
| 7,729,719 | B2 * | 6/2010 | Bergstrom et al. ........ 455/550.1 |
| 7,778,599 | B2 | 8/2010 | Li et al. |
| 7,826,859 | B2 | 11/2010 | Lee et al. |
| 7,839,829 | B2 | 11/2010 | Lee et al. |
| 7,848,308 | B2 | 12/2010 | Lee et al. |
| 7,881,724 | B2 | 2/2011 | Park et al. |
| 8,031,668 | B2 | 10/2011 | Wang et al. |
| 8,036,110 | B2 | 10/2011 | Ishii et al. |
| 8,068,511 | B2 | 11/2011 | Reznik et al. |
| 8,090,382 | B2 | 1/2012 | Park et al. |
| 2001/0021197 | A1 | 9/2001 | Foore et al. |
| 2001/0024956 | A1 | 9/2001 | You et al. |
| 2001/0030953 | A1 | 10/2001 | Chang |
| 2001/0046864 | A1 | 11/2001 | Bhatoolaul et al. |
| 2002/0009129 | A1 | 1/2002 | Choi et al. |
| 2002/0021698 | A1 | 2/2002 | Lee et al. |
| 2002/0021714 | A1 | 2/2002 | Seguin |
| 2002/0028690 | A1 | 3/2002 | McKenna et al. |
| 2002/0032884 | A1 | 3/2002 | Kobata et al. |
| 2002/0041578 | A1 | 4/2002 | Kim et al. |
| 2002/0044527 | A1 | 4/2002 | Jiang et al. |
| 2002/0048316 | A1 | 4/2002 | Imaizumi et al. |
| 2002/0071480 | A1 | 6/2002 | Marjelund et al. |
| 2002/0090004 | A1 | 7/2002 | Rinchiuso |
| 2002/0093928 | A1 | 7/2002 | LoGalbo et al. |
| 2002/0093940 | A1 | 7/2002 | Toskala et al. |
| 2002/0116515 | A1 | 8/2002 | Hashimoto |
| 2002/0126629 | A1 | 9/2002 | Jiang et al. |
| 2002/0131375 | A1 | 9/2002 | Vogel et al. |
| 2002/0160744 | A1 | 10/2002 | Choi et al. |
| 2002/0181436 | A1 | 12/2002 | Mueckenheim et al. |
| 2002/0187789 | A1 | 12/2002 | Diachina et al. |
| 2002/0191559 | A1 | 12/2002 | Chen et al. |
| 2003/0003920 | A1 | 1/2003 | Sebastian |
| 2003/0007510 | A1 | 1/2003 | Yeo et al. |
| 2003/0016672 | A1 | 1/2003 | Rosen et al. |
| 2003/0035440 | A1 | 2/2003 | Casaccia et al. |
| 2003/0043741 | A1 | 3/2003 | Mukai et al. |
| 2003/0050097 | A1 | 3/2003 | Amirijoo et al. |
| 2003/0054829 | A1 | 3/2003 | Moisio |
| 2003/0076812 | A1 | 4/2003 | Benedittis |
| 2003/0078046 | A1 | 4/2003 | Seo |
| 2003/0084185 | A1 | 5/2003 | Pinkerton |
| 2003/0087655 | A1 | 5/2003 | Matsuoka |
| 2003/0103476 | A1 | 6/2003 | Choi et al. |
| 2003/0131124 | A1 | 7/2003 | Yi et al. |
| 2003/0137931 | A1 | 7/2003 | Hans et al. |
| 2003/0139170 | A1 | 7/2003 | Heo |
| 2003/0147371 | A1 | 8/2003 | Choi et al. |
| 2003/0156624 | A1 | 8/2003 | Null |
| 2003/0210669 | A1 | 11/2003 | Vayanos et al. |
| 2003/0223393 | A1 | 12/2003 | Lee |
| 2003/0223452 | A1 | 12/2003 | Toskala et al. |
| 2003/0236085 | A1 | 12/2003 | Ho |
| 2004/0001452 | A1 | 1/2004 | Day et al. |
| 2004/0002334 | A1 | 1/2004 | Lee et al. |
| 2004/0004954 | A1 | 1/2004 | Terry et al. |
| 2004/0006643 | A1 | 1/2004 | Dolson et al. |
| 2004/0008658 | A1 | 1/2004 | Dahlman et al. |
| 2004/0008659 | A1 | 1/2004 | Kim |
| 2004/0014452 | A1 | 1/2004 | Lim et al. |
| 2004/0028078 | A1 | 2/2004 | Beckmann et al. |
| 2004/0057387 | A1 | 3/2004 | Yi et al. |
| 2004/0077357 | A1 | 4/2004 | Nakada |
| 2004/0097192 | A1 | 5/2004 | Schiff |
| 2004/0103435 | A1 | 5/2004 | Yi et al. |
| 2004/0109433 | A1 | 6/2004 | Khan |
| 2004/0114593 | A1 | 6/2004 | Dick et al. |
| 2004/0114606 | A1 | 6/2004 | Haddad |
| 2004/0116143 | A1 | 6/2004 | Love et al. |
| 2004/0117860 | A1 | 6/2004 | Yi et al. |
| 2004/0125772 | A9 | 7/2004 | Wu et al. |
| 2004/0127223 | A1 | 7/2004 | Li et al. |
| 2004/0143676 | A1 | 7/2004 | Baudry et al. |
| 2004/0144593 | A1 | 7/2004 | Shai |
| 2004/0146019 | A1 | 7/2004 | Kim et al. |
| 2004/0147266 | A1 | 7/2004 | Hwang et al. |
| 2004/0147271 | A1 | 7/2004 | Billon et al. |
| 2004/0157602 | A1 | 8/2004 | Khawand |
| 2004/0160919 | A1 | 8/2004 | Balachandran et al. |
| 2004/0171395 | A1 | 9/2004 | Shin |
| 2004/0176094 | A1 | 9/2004 | Kim et al. |
| 2004/0180675 | A1 | 9/2004 | Choi et al. |
| 2004/0184437 | A1 | 9/2004 | Lee et al. |
| 2004/0185860 | A1 | 9/2004 | Marjelund et al. |
| 2004/0196861 | A1 | 10/2004 | Rinchiuso et al. |
| 2004/0198369 | A1 | 10/2004 | Kwak et al. |
| 2004/0202140 | A1 | 10/2004 | Kim et al. |
| 2004/0208160 | A1 | 10/2004 | Petrovic et al. |
| 2004/0219920 | A1 | 11/2004 | Love et al. |
| 2004/0223507 | A1 | 11/2004 | Kuchibhotla et al. |
| 2004/0229626 | A1 | 11/2004 | Yi et al. |
| 2004/0248600 | A1 | 12/2004 | Kim |
| 2004/0264497 | A1 | 12/2004 | Wang et al. |
| 2004/0264550 | A1 | 12/2004 | Dabak |
| 2004/0266494 | A1 | 12/2004 | Ruuska et al. |
| 2005/0008035 | A1 | 1/2005 | Eklund et al. |
| 2005/0013272 | A1 | 1/2005 | Hwang et al. |

(56) References Cited

U.S. PATENT DOCUMENTS

| | | |
|---|---|---|
| 2005/0014508 A1 | 1/2005 | Moulsley et al. |
| 2005/0020260 A1 | 1/2005 | Jeong et al. |
| 2005/0025039 A1 | 2/2005 | Hwang et al. |
| 2005/0026623 A1 | 2/2005 | Fisher |
| 2005/0039101 A1* | 2/2005 | Torsner .................. 714/748 |
| 2005/0041573 A1 | 2/2005 | Eom et al. |
| 2005/0054368 A1 | 3/2005 | Amerga |
| 2005/0059407 A1 | 3/2005 | Reed et al. |
| 2005/0059421 A1 | 3/2005 | Reed et al. |
| 2005/0063336 A1 | 3/2005 | Kim et al. |
| 2005/0068963 A1 | 3/2005 | Lee et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0111393 A1 | 5/2005 | Jeong et al. |
| 2005/0113099 A1 | 5/2005 | Eriksson et al. |
| 2005/0114489 A1 | 5/2005 | Yonge, III et al. |
| 2005/0118947 A1 | 6/2005 | Ames et al. |
| 2005/0129058 A1 | 6/2005 | Casaccia et al. |
| 2005/0135416 A1 | 6/2005 | Ketchum et al. |
| 2005/0138528 A1* | 6/2005 | Ameigeiras et al. .......... 714/774 |
| 2005/0157678 A1 | 7/2005 | Mantha et al. |
| 2005/0157696 A1 | 7/2005 | Yamamoto |
| 2005/0169232 A1 | 8/2005 | Sakoda et al. |
| 2005/0185608 A1 | 8/2005 | Lee et al. |
| 2005/0186973 A1 | 8/2005 | Gaal et al. |
| 2005/0190728 A1 | 9/2005 | Han et al. |
| 2005/0195732 A1 | 9/2005 | Huh et al. |
| 2005/0197134 A1 | 9/2005 | McKenna et al. |
| 2005/0207374 A1 | 9/2005 | Petrovic et al. |
| 2005/0213605 A1 | 9/2005 | Kim et al. |
| 2005/0220049 A1 | 10/2005 | Zhang et al. |
| 2005/0232158 A1 | 10/2005 | Hondo |
| 2005/0243767 A1 | 11/2005 | Zhang et al. |
| 2005/0249141 A1 | 11/2005 | Lee et al. |
| 2005/0249222 A1 | 11/2005 | van Kampen et al. |
| 2005/0251722 A1 | 11/2005 | Terry et al. |
| 2005/0259662 A1 | 11/2005 | Kim et al. |
| 2005/0260997 A1 | 11/2005 | Korale et al. |
| 2005/0265301 A1 | 12/2005 | Heo et al. |
| 2005/0271025 A1 | 12/2005 | Geuthaus et al. |
| 2005/0277429 A1 | 12/2005 | Laroia et al. |
| 2005/0281212 A1 | 12/2005 | Jeong et al. |
| 2005/0281219 A1 | 12/2005 | Kim et al. |
| 2005/0288026 A1 | 12/2005 | Byun et al. |
| 2006/0002367 A1 | 1/2006 | Lee et al. |
| 2006/0007886 A1 | 1/2006 | Lee et al. |
| 2006/0011953 A1 | 1/2006 | Nakahasi et al. |
| 2006/0018289 A1 | 1/2006 | Schulist et al. |
| 2006/0025079 A1 | 2/2006 | Sutskover et al. |
| 2006/0030342 A1 | 2/2006 | Hwang et al. |
| 2006/0045047 A1 | 3/2006 | Choi et al. |
| 2006/0056347 A1 | 3/2006 | Kwak et al. |
| 2006/0059186 A1 | 3/2006 | Backlund |
| 2006/0062196 A1 | 3/2006 | Cai et al. |
| 2006/0072494 A1 | 4/2006 | Matusz |
| 2006/0083183 A1 | 4/2006 | Teague et al. |
| 2006/0088009 A1* | 4/2006 | Gibbs et al. .................... 370/338 |
| 2006/0120403 A1 | 6/2006 | Murata et al. |
| 2006/0143300 A1 | 6/2006 | See et al. |
| 2006/0146745 A1 | 7/2006 | Cai et al. |
| 2006/0146751 A1 | 7/2006 | Obuchi et al. |
| 2006/0153232 A1 | 7/2006 | Shvodian |
| 2006/0154680 A1 | 7/2006 | Kroth et al. |
| 2006/0168343 A1 | 7/2006 | Ma et al. |
| 2006/0193282 A1 | 8/2006 | Ikawa et al. |
| 2006/0256818 A1 | 11/2006 | Shvodian et al. |
| 2006/0258383 A1 | 11/2006 | Jiang et al. |
| 2006/0282739 A1 | 12/2006 | Meyer et al. |
| 2006/0292982 A1 | 12/2006 | Ye et al. |
| 2007/0060146 A1 | 3/2007 | Won et al. |
| 2007/0076680 A1 | 4/2007 | Amram et al. |
| 2007/0081483 A1 | 4/2007 | Jang et al. |
| 2007/0081513 A1* | 4/2007 | Torsner .................. 370/349 |
| 2007/0098006 A1 | 5/2007 | Parry et al. |
| 2007/0099619 A1 | 5/2007 | Parekh et al. |
| 2007/0104151 A1 | 5/2007 | Papasakellariou et al. |
| 2007/0110101 A1 | 5/2007 | Wu |
| 2007/0117579 A1 | 5/2007 | Cai et al. |
| 2007/0121543 A1 | 5/2007 | Kuchibhotla et al. |
| 2007/0133458 A1 | 6/2007 | Chandra et al. |
| 2007/0135080 A1 | 6/2007 | Islam et al. |
| 2007/0140115 A1 | 6/2007 | Bienas et al. |
| 2007/0147315 A1 | 6/2007 | Khoury et al. |
| 2007/0147326 A1 | 6/2007 | Chen |
| 2007/0191054 A1 | 8/2007 | Das et al. |
| 2007/0206531 A1 | 9/2007 | Pajukoski et al. |
| 2007/0218930 A1 | 9/2007 | Kuo |
| 2007/0254595 A1 | 11/2007 | Yoon et al. |
| 2007/0254662 A1 | 11/2007 | Khan et al. |
| 2007/0274253 A1 | 11/2007 | Zhang et al. |
| 2008/0004054 A1 | 1/2008 | Barbaresi et al. |
| 2008/0031253 A1 | 2/2008 | Kim et al. |
| 2008/0043619 A1 | 2/2008 | Sammour et al. |
| 2008/0069031 A1 | 3/2008 | Zhang et al. |
| 2008/0076359 A1 | 3/2008 | Charpentier et al. |
| 2008/0095105 A1 | 4/2008 | Sundberg et al. |
| 2008/0130643 A1 | 6/2008 | Jain et al. |
| 2008/0137564 A1 | 6/2008 | Herrmann |
| 2008/0212541 A1 | 9/2008 | Vayanos et al. |
| 2008/0232291 A1 | 9/2008 | Hus et al. |
| 2008/0267136 A1 | 10/2008 | Baker et al. |
| 2008/0285501 A1 | 11/2008 | Zhang et al. |
| 2009/0052388 A1 | 2/2009 | Kim et al. |
| 2009/0109912 A1 | 4/2009 | DiGirolamo et al. |
| 2009/0129330 A1 | 5/2009 | Kim et al. |
| 2009/0156194 A1 | 6/2009 | Meylan |
| 2009/0163211 A1 | 6/2009 | Kitazoe et al. |
| 2009/0175241 A1 | 7/2009 | Ohta et al. |
| 2009/0175253 A1 | 7/2009 | Wu et al. |
| 2009/0201948 A1 | 8/2009 | Patwardhan et al. |
| 2009/0238141 A1 | 9/2009 | Damnjanovic et al. |
| 2009/0319850 A1 | 12/2009 | Baek et al. |
| 2009/0323624 A1 | 12/2009 | Kim |
| 2009/0323646 A1 | 12/2009 | Ketchum et al. |
| 2010/0014430 A1 | 1/2010 | Oka |
| 2010/0034095 A1 | 2/2010 | Ho et al. |
| 2010/0103899 A1 | 4/2010 | Kwak et al. |
| 2010/0105334 A1 | 4/2010 | Terry et al. |
| 2011/0038376 A1 | 2/2011 | Wiemann et al. |

FOREIGN PATENT DOCUMENTS

| | | |
|---|---|---|
| CN | 1315121 | 9/2001 |
| CN | 1346191 | 4/2002 |
| CN | 1383626 | 12/2002 |
| CN | 1411668 | 4/2003 |
| CN | 1430359 | 7/2003 |
| CN | 1476267 | 2/2004 |
| CN | 1565140 | 1/2005 |
| CN | 1649285 | 8/2005 |
| CN | 1656840 | 8/2005 |
| CN | 1663158 | 8/2005 |
| CN | 1669350 | 9/2005 |
| CN | 1692661 | 11/2005 |
| DE | 10305358 | 7/2004 |
| DE | 10337828 | 4/2005 |
| EP | 1088415 | 12/1999 |
| EP | 0978958 | 2/2000 |
| EP | 1009184 | 6/2000 |
| EP | 1041850 | 10/2000 |
| EP | 1212853 | 12/2001 |
| EP | 1172766 | 1/2002 |
| EP | 1213939 | 6/2002 |
| EP | 1261222 A1 | 11/2002 |
| EP | 1315342 | 5/2003 |
| EP | 1361514 | 11/2003 |
| EP | 1392074 | 2/2004 |
| EP | 1441473 | 7/2004 |
| EP | 1478203 | 11/2004 |
| EP | 1496639 | 1/2005 |
| EP | 1511245 | 3/2005 |
| EP | 1545040 | 6/2005 |
| EP | 1551113 | 7/2005 |

(56) References Cited

FOREIGN PATENT DOCUMENTS

| | | |
|---|---|---|
| EP | 1557968 | 7/2005 |
| EP | 1599063 A1 | 11/2005 |
| EP | 1605724 | 12/2005 |
| EP | 1641189 | 3/2006 |
| EP | 1684538 | 7/2006 |
| EP | 1757135 | 2/2007 |
| JP | 6-013959 | 1/1994 |
| JP | 06-121001 | 4/1994 |
| JP | 9-055693 | 2/1997 |
| JP | 1997-186704 | 7/1997 |
| JP | 9-327072 | 12/1997 |
| JP | 11-177621 | 7/1999 |
| JP | 11-215192 | 8/1999 |
| JP | 11-308671 | 11/1999 |
| JP | 11-331949 | 11/1999 |
| JP | 2000-032088 | 1/2000 |
| JP | 2000-069555 | 3/2000 |
| JP | 2000-151494 | 5/2000 |
| JP | 2000-175271 | 6/2000 |
| JP | 2000-184428 | 6/2000 |
| JP | 2001-95031 | 4/2001 |
| JP | 2001-298770 | 10/2001 |
| JP | 2002064589 | 2/2002 |
| JP | 2002-135231 | 5/2002 |
| JP | 2002-374321 | 12/2002 |
| JP | 2003-008635 | 1/2003 |
| JP | 2003078480 | 3/2003 |
| JP | 2003-116172 | 4/2003 |
| JP | 2003174470 | 6/2003 |
| JP | 2003333661 | 11/2003 |
| JP | 2004-128967 | 4/2004 |
| JP | 2004-320165 | 11/2004 |
| JP | 2004312771 | 11/2004 |
| JP | 2004-343258 | 12/2004 |
| JP | 2004-349884 | 12/2004 |
| JP | 2005072634 | 3/2005 |
| JP | 2005-517369 | 6/2005 |
| JP | 2005217743 | 8/2005 |
| JP | 2005525066 | 8/2005 |
| JP | 2005-236988 | 9/2005 |
| JP | 2005-237013 | 9/2005 |
| JP | 2005-244958 | 9/2005 |
| JP | 2005278167 | 10/2005 |
| JP | 2005-536168 | 11/2005 |
| JP | 2005-539462 | 12/2005 |
| JP | 2006-14372 | 1/2006 |
| JP | 2006-020044 | 1/2006 |
| JP | 2006025437 | 1/2006 |
| JP | 2006-505998 | 2/2006 |
| JP | 2006352705 | 12/2006 |
| JP | 2009-284532 | 12/2009 |
| KR | 1020010111634 | 12/2001 |
| KR | 1020010111637 | 12/2001 |
| KR | 20020077817 | 10/2002 |
| KR | 10-2002-0087560 | 11/2002 |
| KR | 20020096900 | 12/2002 |
| KR | 10-2003-0064263 | 7/2003 |
| KR | 1020040048675 | 6/2004 |
| KR | 10-2004-0058638 | 7/2004 |
| KR | 1020040064867 | 7/2004 |
| KR | 1020040089937 | 10/2004 |
| KR | 10-2005-0019945 | 3/2005 |
| KR | 10-2005-0020459 | 3/2005 |
| KR | 1020050029395 | 3/2005 |
| KR | 10-2005-0031268 | 4/2005 |
| KR | 10-2005-0046305 | 5/2005 |
| KR | 10-2005-0073237 | 7/2005 |
| KR | 10-2005-0078635 | 8/2005 |
| KR | 10-2005-0078636 | 8/2005 |
| KR | 10-2005-0078640 | 8/2005 |
| KR | 10-2005-0081511 | 8/2005 |
| KR | 10-2005-0081836 | 8/2005 |
| KR | 10-2005-0110533 | 11/2005 |
| KR | 1020050119054 | 12/2005 |
| KR | 10-2006-0012210 | 2/2006 |
| RU | 2168278 | 5/2001 |
| RU | 2191479 | 10/2002 |
| RU | 2232469 | 7/2004 |
| RU | 2237380 | 9/2004 |
| RU | 2232477 | 10/2004 |
| RU | 2263415 | 10/2005 |
| RU | 2270526 | 2/2006 |
| RU | 2009106289 | 8/2010 |
| TW | 407407 | 10/2000 |
| TW | 548916 | 8/2003 |
| TW | 552815 | 9/2003 |
| TW | 576027 | 2/2004 |
| TW | 586283 | 5/2004 |
| TW | 589818 | 6/2004 |
| TW | 590340 | 6/2004 |
| TW | 592412 | 6/2004 |
| TW | I228008 | 2/2005 |
| TW | I229268 | 3/2005 |
| TW | I229514 | 3/2005 |
| TW | 200522579 | 7/2005 |
| TW | I237478 | 8/2005 |
| TW | I239731 | 9/2005 |
| TW | I239756 | 9/2005 |
| TW | 200536318 | 11/2005 |
| TW | I242951 | 11/2005 |
| TW | 2005-41258 | 12/2005 |
| TW | M283441 | 12/2005 |
| TW | 2006-01727 | 1/2006 |
| TW | 200605549 | 2/2006 |
| TW | I253824 | 4/2006 |
| WO | 94/09597 | 4/1994 |
| WO | 98/47302 | 10/1998 |
| WO | 98/49857 | 11/1998 |
| WO | 9944383 | 9/1999 |
| WO | 9960729 | 11/1999 |
| WO | 99-63713 A1 | 12/1999 |
| WO | 01/05068 | 1/2001 |
| WO | 01/05121 | 1/2001 |
| WO | 01/20924 | 3/2001 |
| WO | 01/35586 | 5/2001 |
| WO | 01/35692 | 5/2001 |
| WO | 01/37473 | 5/2001 |
| WO | 01/86888 | 11/2001 |
| WO | 0203720 | 1/2002 |
| WO | 02/39697 | 5/2002 |
| WO | 02-39760 A2 | 5/2002 |
| WO | 02/43403 | 5/2002 |
| WO | WO02/47417 | 6/2002 |
| WO | 02-075442 | 9/2002 |
| WO | 02-102110 | 12/2002 |
| WO | WO03/007636 | 1/2003 |
| WO | 03/017688 | 2/2003 |
| WO | WO03/017691 | 2/2003 |
| WO | WO03/043259 | 5/2003 |
| WO | 03/047155 | 6/2003 |
| WO | WO 03047155 A1 * | 6/2003 |
| WO | 03/055142 | 7/2003 |
| WO | WO03/056723 | 7/2003 |
| WO | 03/069934 | 8/2003 |
| WO | 03/087978 | 10/2003 |
| WO | 03/096571 | 11/2003 |
| WO | 2004/030393 | 4/2004 |
| WO | 2004-034656 A2 | 4/2004 |
| WO | 2004/043012 | 5/2004 |
| WO | 2004045234 | 5/2004 |
| WO | 2004/079971 | 9/2004 |
| WO | 2004075442 | 9/2004 |
| WO | 2004-089030 | 10/2004 |
| WO | WO 2004091130 A1 * | 10/2004 |
| WO | 2004/100598 | 11/2004 |
| WO | 2004/102901 | 11/2004 |
| WO | 2005/006660 | 1/2005 |
| WO | 2005/018269 | 2/2005 |
| WO | 2005018144 | 2/2005 |
| WO | 2005/036917 | 4/2005 |
| WO | 2005/039134 | 4/2005 |
| WO | WO 2005034418 A1 * | 4/2005 |
| WO | 2005/048616 | 5/2005 |
| WO | 2005/050918 | 6/2005 |

(56) References Cited

FOREIGN PATENT DOCUMENTS

| WO | 2005055472 | | 6/2005 |
|---|---|---|---|
| WO | 2005/071887 | | 8/2005 |
| WO | 2005-074312 | A1 | 8/2005 |
| WO | 2005072073 | | 8/2005 |
| WO | 2005078967 | | 8/2005 |
| WO | 2005079021 | | 8/2005 |
| WO | 2005-088886 | A1 | 9/2005 |
| WO | 2005-099125 | | 10/2005 |
| WO | 2005/101738 | | 10/2005 |
| WO | 2005/109695 | | 11/2005 |
| WO | 2005/109837 | | 11/2005 |
| WO | 2005/114884 | | 12/2005 |
| WO | 2005/117317 | | 12/2005 |
| WO | 2005-125125 | | 12/2005 |
| WO | 2005119941 | | 12/2005 |
| WO | 2006/012946 | | 2/2006 |
| WO | 2006/033552 | | 3/2006 |
| WO | 2006/118393 | | 11/2006 |
| WO | 2007066883 | | 6/2007 |
| WO | 2007/078155 | | 7/2007 |
| WO | WO 2007095966 | A1 * | 8/2007 |

OTHER PUBLICATIONS

NTT DOCOMO et al.: "Multiplexing Method of Shared Control Channel in Uplink Single-Carrier FDMA Radio Access," 3GPP TSG-RAN WG1, R1-051143 [online], Oct. 10, 2005. Retrieved from the Internet on Jul. 24, 2008: <http://www.3gpp.org/ftp/tsg_ran/wg1_rl1/TSGR1_42bis/Docs/R1-051143.zip>.
LG Electronics Inc., "UE state transition in LTE_ACTIVE," 3GPP TSG-RAN WG2 #52, R2-061002, Mar. 27, 2006, XP050130928.
Ericsson, "LTE States in E-UTRAN," 3GPP TSG-RAN WG2 Meeting #48bis, R2-052425, Oct. 10, 2005, XP050129534.
Motorola et al., "MAC-e/es header and functional split," R2-042360, 3GPP TSG RAN WG2 Meeting#45, Nov. 2004.
Ericsson, "User plane protocol enhancements," R2-052749, TSG-RAN WG2 Meeting #48bis, Oct. 2005.
LG Electronics Inc., "MAC Enhancement," R2-060561, 3GPP TSG-RAN WG2 #51, Feb. 2006.
Qualcomm, "Need for MAC-hs segmentation mechanism," R2-020769, 3GPP TSG-RAN WG2 Meeting #28, Apr. 2002.
3rd Generation Partnership Project (3GPP), "LTE: Evolved Universal Terrestrial Radio Access (E-UTRA) Medium Access Control (MAC) Protocol Specification (Release 8)," 3GPP TS 36.321 v8.4.0, Jan. 2009.
Xu, H., et al.; "Performance Analysis on the Radio Link Control Protocol of UMTS System"; 2002 IEEE 56th Vehicular Technology Conference Proceedings; pp. 2026-2030; Sep. 2002.
Haardt, M., et al., "The TD-CDMA Based UTRA TDD Mode," IEEE Journal on Selected Areas in Communications, vol. 18, No. 8, pp. 1375-1385, Aug. 2000.
Zdarsky, Frank A. et al., "Handover in Mobile Communication Networks: Who is in Control Anyway?", Proceedings of the 30th ~EUROMICRO Conference, Aug. 31, 2004, XP10723593, pp. 205-212.
Ericsson: "E-UTRA Random Access", 3GPP TSG-RAN WG1, R1-051445, Nov. 7, 2005, XP003020952.
Derryberry R. T., et al., "On CDMA 2000 evolution—Reverse high-speed packet data physical layer enhancements in CDMA 2000 1xEV-DV.", IEEE Communications Magazine, Apr. 1, 2005, vol. 43, Nr. 4, pp. 41-47, XP001228792.
Chung J. et al., "Packet synchronization and identification for incremental redundancy transmission in FH-CDMA systems", 3rd IEEE International Symposium on Personal, Indoor and Mobile Radio Communications, Boston, MA, USA, Oct. 19, 1992, pp. 292-295, XP01017082, ISBN 0-7803-0841-7.
China Mobile, "RRC States Analysis In LTE," 3GPP TSG RAN WG2#48, R2-052140, Aug. 29, 2005.
Panasonic, "E-UTRA Transport And Logical Channels," 3GPP TSG RAN WG2#49, R2-052860, Nov. 7, 2005.

Siemens, "States In E-UTRAN," 3GPP TSG-RAN WG RAN2#48, R2-052501, Aug. 29, 2005.
Qualcomm Europe, "Signaling Optimization For E-UTRAN," 3GPP TSG-RAN WG2 Meeting #48-bis, R2-052407, Oct. 10, 2005.
Qualcomm, "Need for MAC-hs segmentation mechanism," 3GPP TSG-RAN WG2 meeting #28, R2-020769, Apr. 2002.
Phillips: "Evolved Paging Indicators for LTE", 3GPP TSG-RAN WG2, R2-052985 [online], Nov. 7, 2005.
Sarka, S. et al.: Common-Channel Soft Handoff in cdma2000—The Paging Channel. IEEE Transactions on Microwave Theory and Techniques. Jun. 2000.
NTT DOCOMO, et al.: "Paging Channel Structure for E-UTRA Downlink", 3GPP TSG-RAN WG1, R1-060034 [online], Jan. 23, 2006.
Motorola: "Paging Channel Design for E-UTRA", 3GPP TSG-RAN WG1,R1-061712 [online] Jun. 27, 2006.
LG Electronics Inc.: "Framing In the MAC entity", 3GPP TSG-RAN WG2, R2-061012 [online] Mar. 2006.
LG Electronics Inc:"HARQ and ARQ Operation", 3GPP TSG-RAN WG2, R2-060106 [online], Jan. 9, 2006.
Ericsson, "Solution for sending NAS together with RRC connection request," R2-071817, 3GPP TSG-RAN WG2#58, May 2007.
LG Electronics Inc., "Default SRB for initial access," R2-061958, 3GPP TSG-RAN WG2 LTE Ad-hoc, Jun. 2006.
3rd Generation Partnership Project (3GPP), "Technical Specification Group Radio Access Network; Introduction of the Multimedia Broadcast Multicast Service (MBMS) in the Radio Access Network (RAN); Stage 2 (Release 6)," 3GPP TS 25.346 V6.7.0, Dec. 2005.
3rd Generation Partnership Project (3GPP), "Universal Mobile Telecommunications System (UMTS); Radio Resource Control (RRC) protocol specification (3GPP TS 25.331 version 6.8.0 Release 6)," ETSI TS 125 331, Dec. 2005.
IPWIRELESS, "Layer 2 functions for LTE", R2-052377, 3GPP TSG RAN WG2 #48bis, Oct. 2005, XP-050129489.
LG Electronics Inc., "MAC Architecture of LTE", R2-060105, 3GPP TSG-RAN WG2 #50, Jan. 2006, XP-050130258.
LG Electronics Inc., "Discussion on RLC PDU Structure", R2-070721, 3GPP TSG-RAN WG2 #57, Feb. 2007, XP-050133754.
LG Electronics Inc., "HARQ and ARQ Operation", R2-060563, 3GPP TSG-RAN WG2 #51, Feb. 2006, XP-050130522.
3rd Generation Partnership Project (3GPP), "Technical Specification Group GERAN; Packet-switched handover for GERAN A/Gb mode; Stage 2 (Release 6)", 3GPP TS 43.129 V6.6.0, Jan. 2006, 70 pages, XP50378285.
European Patent Office Application Serial No. 06812408.0, Search Report dated Nov. 22, 2012, 6 pages.
Taiwan Intellectual Property Office Application Serial No. 096104339, Office Action dated Dec. 6, 2012, 6 pages.
Qualcomm, "Max Number of MAC-hs header extensions," R2-042023, 3GPP TSG-RAN WG2 meeting #44, Sep. 29, 2004, XP050126646.
In the U.S. Appl. No. 13/410,221, Non-Final Office Action dated Oct. 15, 2012, 12 pages.
European Patent Office Application Serial No. 07700865.4, Search Report dated Nov. 8, 2012, 6 pages.
Philips, "Random Access considerations and discussion of L1 questions from RAN2", R1-060143, 3GPP TSG RAN WG1 LTE Adhoc, Jan. 2006, XP50417365.
RAN2, "LTE L1 related questions to RAN1", R1-060061, 3GPP TSG RAN WG1 LTE Ad Hoc Meeting, Jan. 2006, XP50491669.
Ericssion, "Initial, Random Access and Identity Handling", R2-060592, TSG-RAN WG2 Meeting #51, Feb. 2006, XP50130549.
European Patent Office Application Serial No. 11004852.7, Search Report dated Nov. 5, 2012, 9 pages.
European Patent Office Application Serial No. 07747053.2, Search Report dated Nov. 13, 2012, 6 pages.
Qualcomm Europe, "Access procedure for LTE", R2-060362, 3GPP TSG-RAN WG2 LTE, Feb. 2006, 4 pages.
European Patent Office Application Serial No. 07700868.8, Office Action dated Nov. 2, 2012, 7 pages.
U.S. Appl. No. 12/159,981, Office Action dated Jan. 18, 2013, 11 pages.

(56) References Cited

OTHER PUBLICATIONS

European Patent Office Application Serial No. 07747056.5, Search Report dated Feb. 14, 2013, 7 pages.
European Patent Office Application Serial No. 07746856.9, Search Report dated Jan. 31, 2013, 8 pages.
3rd Generation Partnership Project (3GPP), "Universal Mobile Telecommunications System (UMTS); Radio interface protocol architecture (3GPP TS 25.301 version 6.4.0 Release 6)", ETSI TS 125 301, V6.4.0, Sep. 2005, 50 pages (relevant pp. 1-48).
European Patent Office Application Serial No. 07700814.2, Summons to attend oral proceedings dated Feb. 18, 2013, 5 pages.
European Patent Office Application Serial No. 07700867.0, Search Report dated Feb. 27, 2013, 9 pages.
NTT DoCoMo, Inc., et al., "Summary (with revision marks) of email discussion point 3: Initial access procedure: C-RNTI and HARQ," 3GPP TSG RAN WG2 #56bis, Tdoc-R2-070338, Jan. 2007, 10 pages.
IPWireless, et al., "RACH access optimisation," 3GPP TSG RAN WG2 #59, R2-073186, Jun. 2007, 6 pages.
Taiwan Intellectual Property Office Application Serial No. 096104339, Office Action dated May 28, 2013, 5 pages.
European Patent Office Application Serial No. 13163775.3, Search Report dated May 27, 2013, 6 pages.
RAN WG2, "Answer to RAN1 questions on MBMS," 3GPP RAN WG2 Meeting #43, R2-041907, Aug. 2004, 4 pages.
European Patent Office Application Serial No. 07708430.9, Search Report dated Jun. 5, 2013, 9 pages.
European Patent Office Application Serial No. 07700845.6, Office Action dated May 22, 2013, 6 pages.
Nortel, "Proposal for the Uplink Multiple Access Scheme for E-UTRA," 3GPP TSG RAN WG1 #42bis, R1-051165, Oct. 2005, 18 pages.
Intellectual Property Office of India Application Serial No. 2299/KOLNP/2008, Office Action dated Jun. 27, 2013, 1 page.
Korean Intellectual Property Office Application Serial No. 10-2006-0088273, Notice of Allowance dated Mar. 28, 2013, 2 pages.
LG Electronics, "Initial access for LTE," TSG-RAN Working Group 2 #49, R2-052769, Nov. 2005, 2 pages.
Taiwan Intellectual Property Office Application Serial No. 096104519, Office Action dated Apr. 17, 2013, 3 pages.
European Patent Office Application Serial No. 11001176.4, Search Report dated Oct. 24, 2012, 8 pages.
Taiwan Intellectual Property Office Application Serial No. 096100583, Office Action dated Mar. 18, 2013, 8 pages.
European Patent Office Application Serial No. 07747052.4, Search Report dated Mar. 14, 2013, 8 pages.
Korean Intellectual Property Office Application Serial No. 10-2006-0107104, Notice of Allowance dated Apr. 12, 2013, 2 pages.
Korean Intellectual Property Office Application Serial No. 10-2007-0000767, Notice of Allowance dated Nov. 15, 2013, 2 pages.
European Patent Office Application Serial No. 07700843.1, Search Report dated Nov. 28, 2013, 8 pages.
European Patent Office Application Serial No. 13190899.8, Search Report dated Dec. 2, 2013, 7 pages.
Intellectual Property Office of India Application Serial No. 3088/KOLNP/2008, Office Action dated Jul. 29, 2013, 2 pages.
The State Intellectual Property Office of the People's Republic of China Application Serial No. 201110399482.9, Office Action dated Aug. 21, 2013, 6 pages.
Texas Instruments, "A new preamble shape for the Random Access preamble in E-UTRA," 3GPP TSG RAN WG1 #44-bis, R1-060867, Mar. 2006, 5 pages.
U.S. Appl. No. 12/159,849, Office Action dated Sep. 16, 2014, 8 pages.
Intellectual Property Office of India Application Serial No. 3868/KOLNP/2008, Office Action dated Aug. 18, 2014, 2 pages.
Korean Intellectual Property Office Application Serial No. 10-2007-0002962, Notice of Allowance dated Mar. 27, 2014, 2 pages.
U.S. Appl. No. 13/677,232, Office Action dated Apr. 25, 2014, 7 pages.
3rd Generation Partnership Project (3GPP), "Technical Specification Group Radio Access Network; Physical channels and mapping of transport channels onto physical channels (FDD) (Release 5)," 3GPP TS 25.211 V5.8.0, Dec. 2005, 39 pages.
The State Intellectual Property Office of the People's Republic of China Application Serial No. 201210049981.X, Office Action dated Nov. 4, 2014, 5 pages.

\* cited by examiner

METHOD OF SUPPORTING HANDOVER IN A WIRELESS COMMUNICATION SYSTEM

TECHNICAL FIELD

The present invention relates to a mobile communication system, more particularly, to a method of supporting to perform handover efficiently in a mobile communication system.

BACKGROUND ART

A user equipment (UE) has to move according to a user's movement in a mobile communication system unlikely a wired communication system. Accordingly, mobility of the user equipment should be considered in the mobile communication system. In other words, in the mobile communication system, a network is supposed to support capabilities for providing with the user equipment services above certain levels even in case that the user equipment moves from an area to other area. More particularly, when the user equipment goes away from a first network entity with which the user equipment has a connection and moves into a new second network entity, the network should perform a procedure like handover, etc for shifting an access point of the user equipment from the first network entity to the second network entity. The first and second network entities may be base stations or other higher network nodes. When the first and second network entities are the base stations, the first network entity can be called a serving or center base station and the second network entity a target base station.

A WCDMA system in accordance with the $3^{rd}$ generation partnership project (3GPP) technical specification supports three radio link control (RLC) modes to provide a variety of quality of services (QoS) for different kinds of services, which are a transparent mode (TM), an unacknowledged mode (UM), and an acknowledged mode (AM). Each RLC mode is carried out by a corresponding entity of an RLC layer. Since the quality of service (QoS) supported by each RLC mode is different each other, operating processes and detailed functions of each RLC mode also differs.

The acknowledged mode is different from the transparent mode and the unacknowledged mode in that a receiving side transmits a reception acknowledgement in response to data received from a transmitting side. Namely, the receiving side transmits status report to inform the transmitting side of whether data blocks transmitted from the transmitted side are received successfully. The transmitting side retransmits to the receiving side data blocks for which negative reception acknowledgement are received. An object of the acknowledged mode is to support error-free data transmission. The acknowledged mode is usually used for transmitting non-real time packet data like TCP/IP data, etc and radio resource control (RRC) messages for which reception acknowledgements are necessary.

An acknowledged mode (AM) entity of a radio link control (RLC) layer has a complicated structure due to the retransmission function described above. The AM entity performs a variety of functions such as flow control with transmitting and receiving windows, polling for a transmitting side to request status information to a peer RLC entity of a receiving side, status report for the receiving side to transmit status report to a peer RLC entity of the transmitting side, etc. For those functions, a status protocol data unit (PDU) for delivering status information and a piggyback function by which a status PDU is inserted into a data PDU are supported by the RLC AM entity. Further, the RLC AM entity supports a reset PDU for requesting re-establishment of all operations and parameters to a counterpart AM entity when the RLC AM entity finds an important error during operation and a reset ACK PDU for responding to the reset PDU. A plurality of protocol parameters, status variables and timers are necessary for the AM RLC entity to perform the above-described functions. A PDU like a status PDU or reset PDU, which is used for controlling data transmission in the AM RLC entity is called a control PDU and a PDU for delivering user data is called a data PDU.

In case that a user equipment changes a network entity like a base station with which a connection is established due to a reason such as handover, etc, data loss and unnecessary repeated data transmission should be limited within a minimum range during the changing procedure. For instance, when a user equipment acting in the acknowledged mode performs handover from a source base station to a target base station, the source base station is supposed to transmit data blocks to be transmitted to the user equipment to the target base station. In this case, a transmission buffer or a retransmission buffer in the AM RLC entity of the source base station is storing data blocks which has not been transmitted to the user equipment at all and data blocks which has been transmitted to the user equipment but has received negative reception acknowledgements from the user equipment. Accordingly, when the source base station delivers data blocks for the user equipment to the target base station, efficient methods are required to avoid data loss or unnecessary repeated data transmission. Further, a method of new status report for the user equipment is needed for supporting efficient data transfers from the source base station to the target base station.

DISCLOSURE OF THE INVENTION

The present invention is directed to a method of performing handover and supporting thereof.

An object of the present invention is to provide a method for avoiding data loss and repeated data transmission during handover in a mobile communication system.

Another object of the present invention is to provide a method of supporting handover thereby a source base station efficiently transfers user data to a target base station during handover in a mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method of supporting handover at a first network entity in a mobile communication system, the method comprising transmitting a plurality of data blocks of a first layer to a user equipment, checking whether each of the plurality of data blocks is successfully transmitted to the user equipment, and transmitting to a second network entity at least one data block of the first layer excluding a data block which is successfully transmitted to the user equipment among the plurality of data blocks of the first layer, the second network entity being a target network entity for handover of the user equipment.

In accordance with another embodiment of the present invention, a method of supporting handover at a first network entity in a mobile communication system comprises transmitting a plurality of first data blocks of a first layer to a user equipment, each of the plurality of first data blocks including at least a part of a second data block transferred from an upper layer, checking whether each of the plurality of first data blocks is transmitted successfully to the user equipment, and transmitting to a second network entity at least one second data block included in a first data block of the first layer excluding a first data block which is successfully transmitted to the user equipment among the plurality of first data blocks, the second network entity being a target network entity for handover of the user equipment.

In accordance with another embodiment of the present invention, a method of transmitting status report for supporting handover at a user equipment in a mobile communication system comprises checking whether a handover command is received from a first network entity, and transmitting status report for at least one data block transmitted from the first network entity to at least one of the first network entity and a second network entity if the handover command is received from the first network entity, the second network entity being a target network entity for handover of the user equipment.

In accordance with another embodiment of the present invention, a method of supporting handover at a first network entity in a mobile communication system comprises transmitting a plurality of data blocks of a first layer to a user equipment, and transmitting to a second network entity at least one data block of the first layer excluding a data block which is successfully transmitted to the user equipment among the plurality of data blocks of the first layer, the second network entity being a target network entity for handover of the user equipment.

In accordance with another embodiment of the present invention, a method of supporting handover at a first network entity in a mobile communication system comprises transmitting a plurality of first data blocks of a first layer to a user equipment, each of the plurality of first data blocks including at least a part of a second data block transferred from an upper layer, and transmitting to a second network entity at least one second data block included in a first data block of the first layer excluding a first data block which is successfully transmitted to the user equipment among the plurality of first data blocks, the second network entity being a target network entity for handover of the user equipment.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

In the drawings.

BEST MODE FOR CARRYING OUT THE INVENTION

Reference will now be made in detail to the preferred embodiments of the present invention, examples of which are illustrated in the accompanying drawings.

Figure 1:
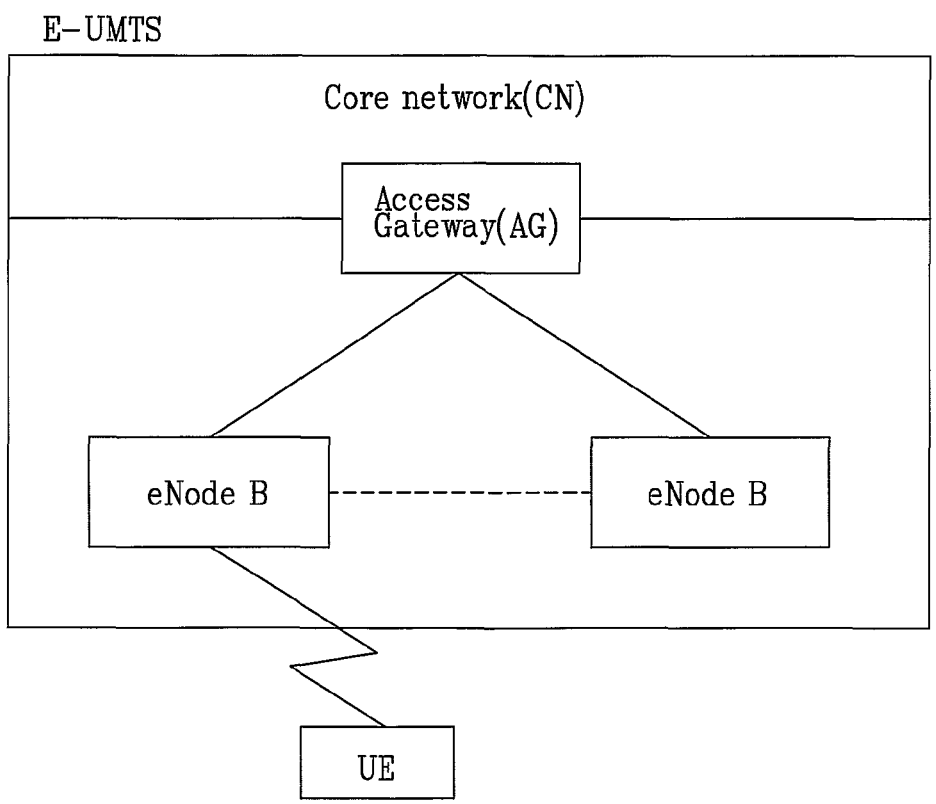
FIG. 1 is a block diagram of a network structure of E-UMTS (evolved universal mobile telecommunications system)

Embodiments described below are examples whit which the technical features of the present invention are applied to an Evolved Universal Mobile Telecommunications System (E-UMTS). FIG. 1 is a block diagram of a network structure of an E-UMTS (Evolved-Universal Mobile Telecommunications System) to which technical features of the present invention are applied. An E-UMTS is a system evolving from the conventional UMTS and its basic standardization is currently handled by the 3GPP ($3^{rd}$ Generation Partnership Project). The E-UMTS can also be called an LTE (Long Term Evolution) system. Release 7 and Release 8 of "3rd Generation Partnership Project; Technical Specification Group Radio Access Network" can be referred to for further technical matters associated with the UMTS and E-UMTS which are not described in this document.

Referring to FIG. 1, an E-UMTS network includes a user equipment (hereinafter abbreviated 'UE'), a base station (eNode B or eNB) and an access gateway (hereinafter abbreviated 'aGW') connected to an external network by being located at an end of the E-UMTS network. The aGW may be classified into a part for handling user traffic and a part for handling control traffic. A first aGW for processing new user traffic may communicate with a second AG for processing control traffic via a new interface. An eNode B may include at least one cell. A first interface for transmitting user traffic or a second interface for transmitting control traffic may be located between several eNode Bs. The CN may include the aGW and a plurality of nodes for registering users of User Equipments (UEs). If required, another interface for discriminating between the E-UTRAN and the CN may also be used for the LTE network. The aGW manages mobility of a UE by unit of a tracking area (TA). A TA comprises a plurality of cells. When a UE moves into a TA from another TA, the UE informs the aGW of the change of the TAs. The eNode B includes at least one cell.

Figure 2:
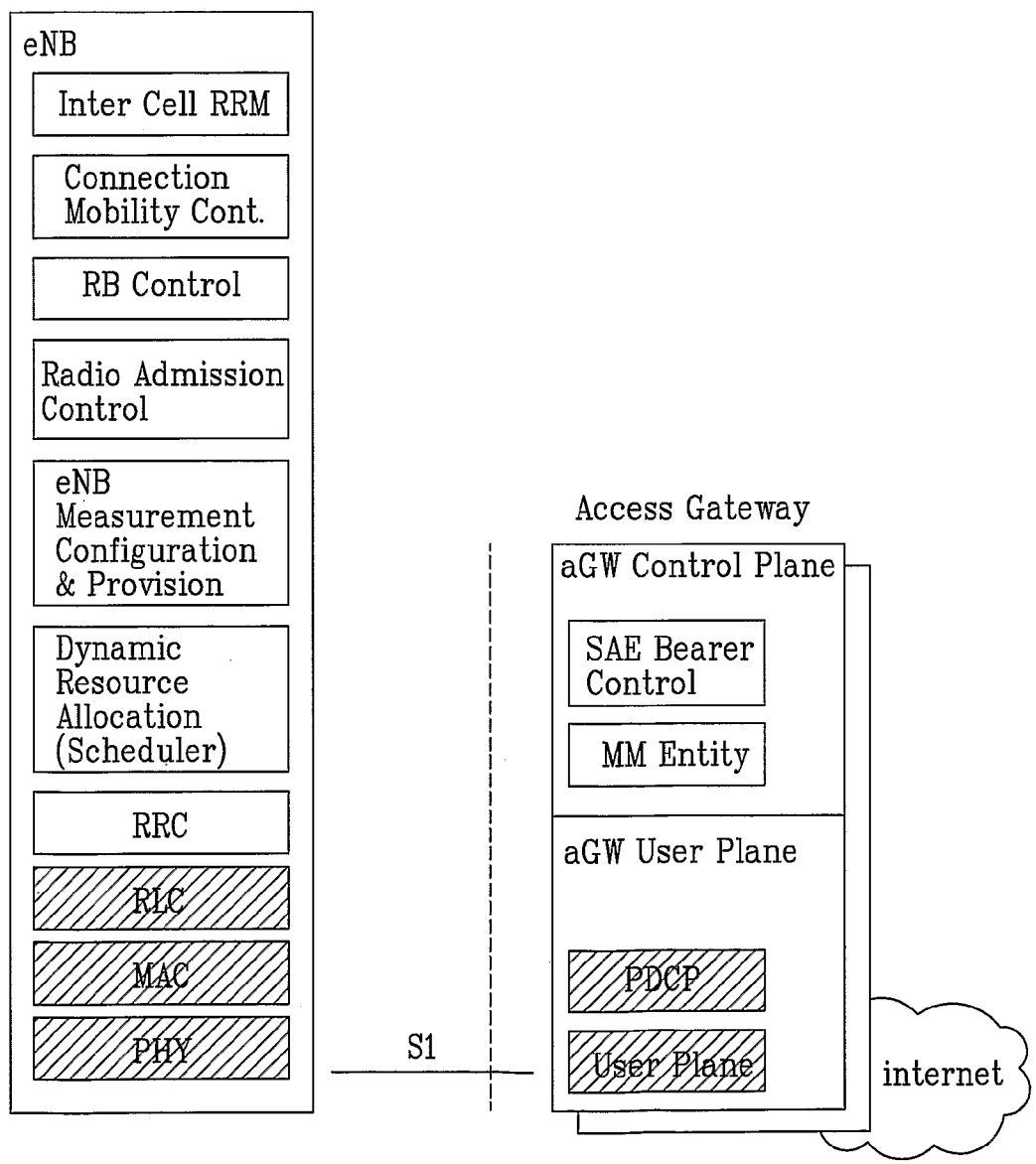
FIG. 2 is a schematic diagram illustrating a protocol architecture of an E-UTRAN.

FIG. 2 is a schematic diagram illustrating protocol architecture of an E-UTRAN. In FIG. 2, the hatching part represents functional entities of a control plane and the non-hatching part represents functional entities of a user plane.

Layers of a radio interface protocol between a UE and a network can be classified into a first layer L1, a second layer L2 and a third layer L3 based on three lower layers of OSI (open system interconnection) reference model widely known in communication systems. A physical layer belonging to the first layer L1 provides an information transfer service using a physical channel. A radio resource control (hereinafter abbreviated 'RRC') located at the third layer plays a role in controlling radio resources between the UE and the network. For this, the RRC layer enables RRC messages to be exchanged between the UE and the network. The RRC layer can be distributively located at network nodes including an eNode B, an AG and the like or at either the Node B or the AG.

Figure 3A:
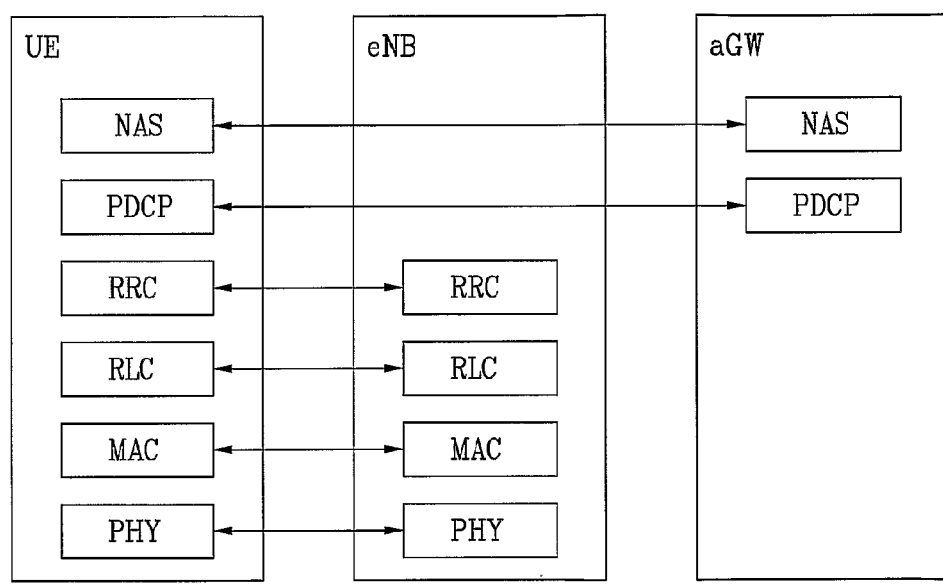
FIGS. 3A and 3B are architectural diagrams of a control plane and a user plane, respectively of a radio interface protocol between UE (user equipment) and UTRAN (UMTS terrestrial radio access network) based on the 3GPP radio access network standard.
Figure 3B:
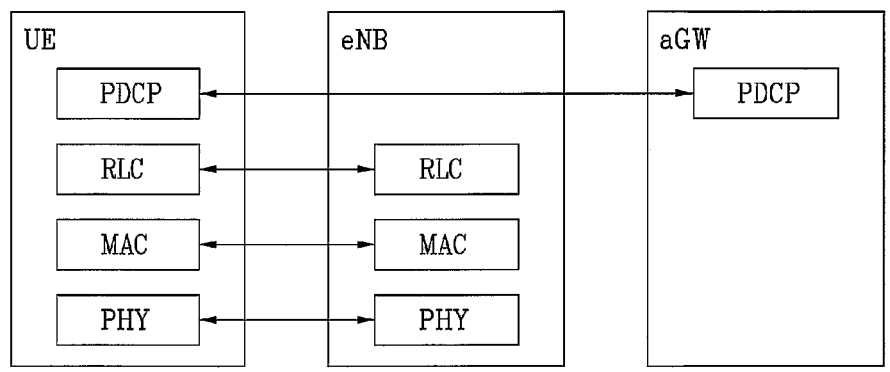

FIGS. 3A and 3B are architectural diagrams of a control plane and a user plane, respectively of a radio interface protocol between UE (user equipment) and UTRAN (UMTS terrestrial radio access network) based on the 3GPP radio access network standard. Referring to FIG. 3A, a radio interface protocol vertically includes a physical layer, a data link layer, and a network layer and horizontally includes a user plane for data information transfer and a control plane for signaling transfer. The protocol layers in FIG. 3A can be classified into L1 (first layer), L2 (second layer), and L3 (third layer) based on three lower layers of the open system interconnection (OSI) standard model widely known in the communications systems.

The respective layers of a radio protocol control plane shown in FIG. 3A and a radio protocol user plane shown in FIG. 3B are explained as follows.

First of all, the physical layer as the first layer provides information transfer service to an upper layer using physical channels. The physical layer (PHY) is connected to a medium access control (hereinafter abbreviated 'MAC') layer above the physical layer via transport channels. Data are transferred between the medium access control layer and the physical layer via the transport channels. Moreover, data is transferred between different physical layers, and more particularly, between one physical layer of a transmitting side and the other physical layer of a receiving side via the physical channels. A downlink physical channel of the E-UMTS is modulated according to an orthogonal frequency division multiplexing (OFDM) scheme and time and frequency are used as radio resources.

The medium access control (hereinafter abbreviated 'MAC') layer of the second layer provides a service to a radio link control (hereinafter abbreviated RLC) layer above the MAC layer via logical channels. The RLC layer of the second layer supports reliable data transfer. In order to effectively transmit IP packets (e.g., IPv4 or IPv6) within a radio-communication period having a narrow bandwidth, a PDCP layer of the second layer (L2) performs header compression to reduce the size of a relatively-large IP packet header containing unnecessary control information.

A radio resource control (hereinafter abbreviated 'RRC') layer located on a lowest part of the third layer is defined in the control plane only and is associated with configuration, reconfiguration and release of radio bearers (hereinafter abbreviated 'RBs') to be in charge of controlling the logical, transport and physical channels. In this case, the RB means a service provided by the second layer for the data transfer between the UE and the UTRAN.

As a downlink transport channel carrying data to UEs from the network, there is a broadcast channel (BCH) carrying system information and a downlink shared channel (SCH) carrying user traffic or control messages. The traffic or control messages of a downlink multicast or broadcast service can be transmitted via the downlink SCH or an additional downlink multicast channel (MCH). Meanwhile, as an uplink transport channel carrying data to the network from UEs, there is a random access channel (RACH) carrying an initial control message and a uplink shared channel (UL-SCH) carrying user traffic or control message.

In the E-UMTS system, an OFDM is used on the downlink and a single carrier frequency division multiple access (SC-FDMA) on the uplink. The OFDM scheme using multiple carriers allocates resources by unit of multiple subcarriers including a group of carriers and utilizes an orthogonal frequency division multiple access (OFDMA) as an access scheme.

A physical layer of an OFDM or OFDMA scheme divides active carriers into a plurality of groups and transmits each group to a different receiving side. Radio resource allocated to each UE which is defined as a time-frequency region on a two-dimensional sphere comprises continuous subcarriers on a frequency axis and symbols on a time axis. A time-frequency region in the OFDM or OFDMA scheme is a rectangular form sectioned by time and frequency coordinates. One or more time-frequency region can be allocated to an uplink for a UE and an eNB can transmit one or more time-frequency region to a UE. In order to define a time-frequency region on the two-dimensional sphere, the number of OFDM symbols and subcarriers starting from a point having an offset from a reference point should be given.

The E-UMTS uses 10 ms radio frame comprising 20 sub-frames. Namely, a sub-frame is 0.5 ins length. A resource block comprises one sub-frame and twelve subcarriers, each of which is 15 kHz. One sub-frame comprises a plurality of OFDM symbols and a part of the plurality of OFDM symbols can be used for L1/2 control information.

Figure 4:
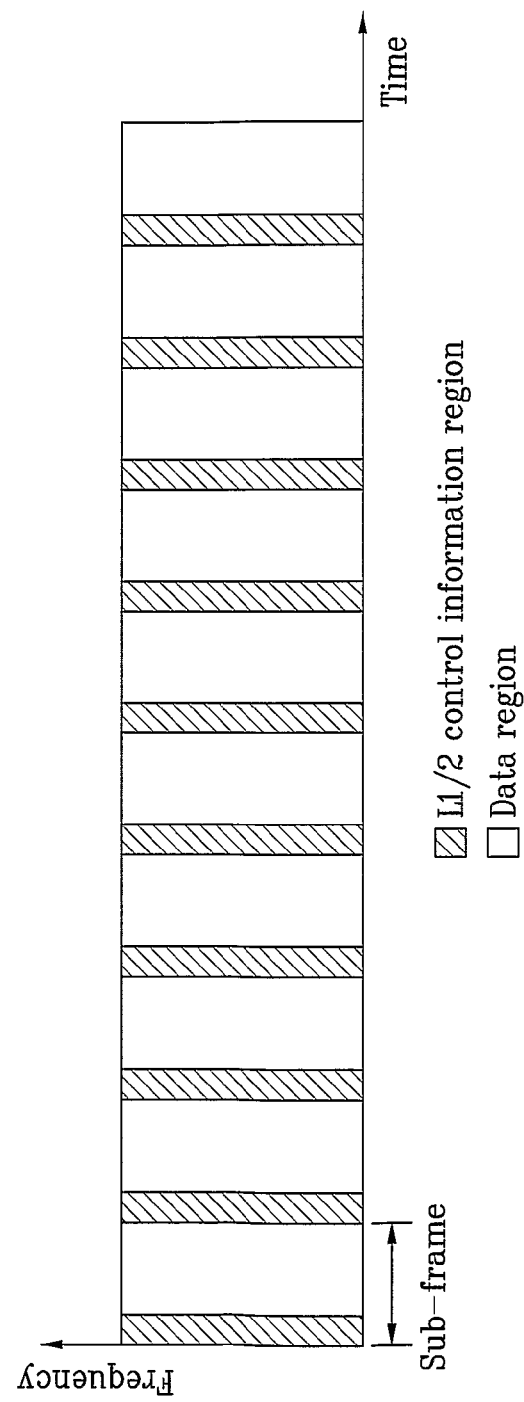
FIG. 4 is a diagram illustrating a structure of physical channels in the E-UMTS.

FIG. 4 is a diagram illustrating a structure of physical channels in the E-UMTS. In FIG. 4, a sub-frame comprises a L1/2 control information transmission region (the hatching part) and a data transmission region (the non-hatching part).

Figure 5:
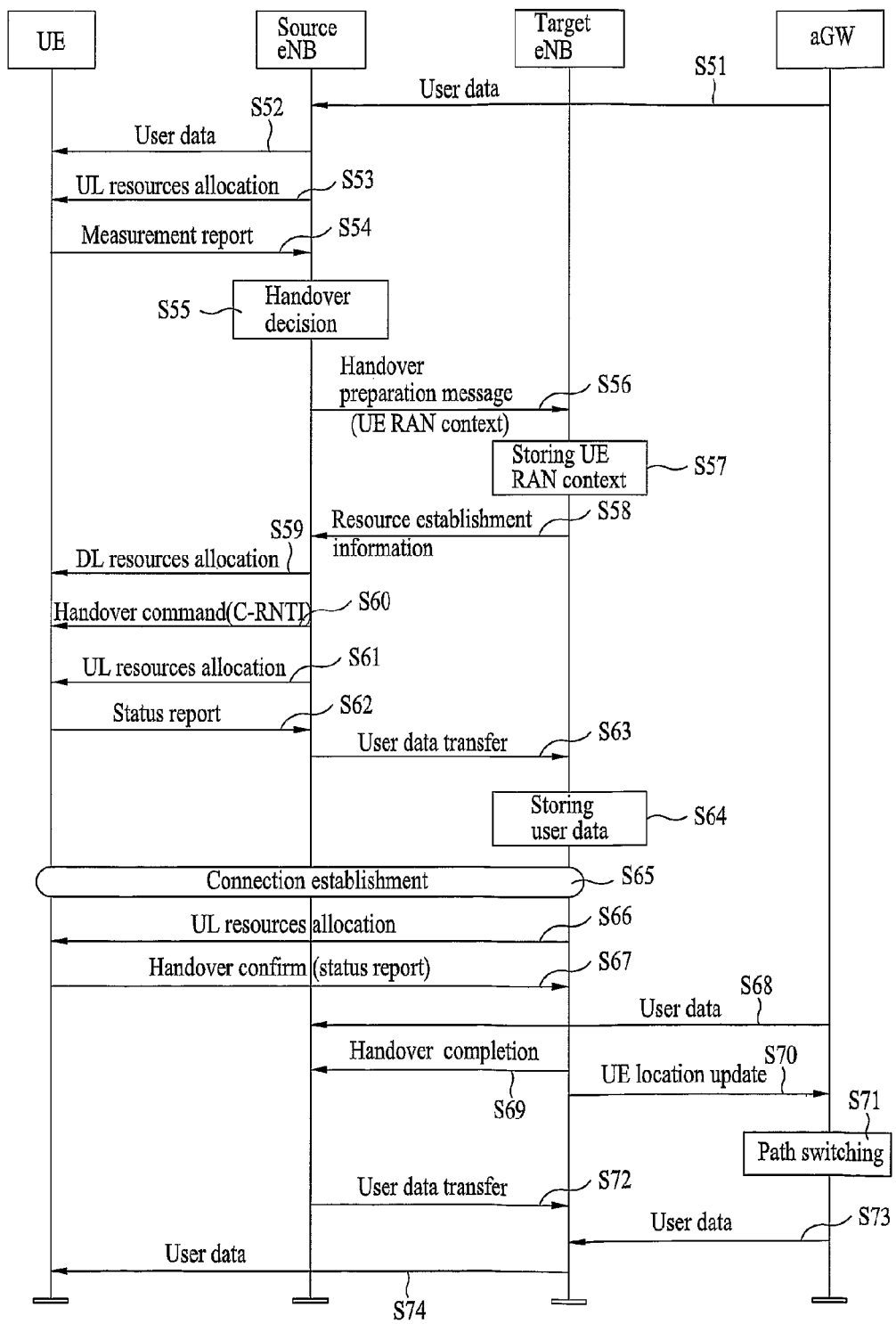
FIG. 5 is a flow diagram illustrating a handover procedure in accordance with an embodiment of the present invention.

FIG. 5 is a flow diagram illustrating a handover procedure in accordance with an embodiment of the present invention in the 3 GPP LTE system.

Referring to FIG. 5, a user equipment (UE) initially has a connection with a source base station (a source eNB) and receives user data from an upper network entity like aGW via the source base station [S51, S52]. The source base station allocates uplink (UL) resources for the user equipment to transmit a message for measurement reports [S53]. The uplink resources means a time-frequency region through which the user equipment can transmit uplink data. The user equipment transmits a measurement report message to the source base station through the allocated uplink resources, i.e. the time-frequency region [S54]. The measurement report message includes information associated with channel qualities between the user equipment and the source base station and at least one neighboring base station. The channel quality information can be represented by a variety of parameters such as a carrier to interference and noise ratio (CINR), a signal to noise ratio (SNR), a bit error rate (BER) or a frame error rate (FER), etc. The source base station determines whether the user equipment performs handover or not based on the contents of the measurement report message [S55]. For example, if a channel quality between the user equipment and a neighboring base station is equal to or higher than a predetermined threshold value from a channel quality between the user equipment and the source base station, the source base station determines that the user equipment should perform handover to the neighboring base station. In this case, the neighboring base station can be a target base station.

After making a handover decision, the source base station transmits a handover preparation message including UE RAN context to the target base station [S56]. The UE RAN context contains information associated with the user equipment, such as a UE identity, security information, and the number of established radio bearer (RB). The target base station stores the UE RAN context received from the source base station [S57]. The target base station secures resources such as radio resources and hardware resources like memory for establishing a connection with the user equipment and then transmits resource establishment information for the user equipment to the source base station [S58]. The resource establishment information includes a new C-RNTI (Cell-Radio Network Temporary Identity) for the user equipment.

The source base station allocates downlink (DL) resources to the user equipment [S59] and transmits a handover command message to the user equipment through the allocation downlink resources [S60]. The handover command message includes the new C-RNTI. After transmitting the handover command message to the user equipment, the source base station allocates to the user equipment uplink resources necessary for status reports [S61].

The user equipment transmits status report through the allocated uplink resources to the source base station [S62]. The status report includes reception acknowledgement information for a plurality of data blocks transmitted from the source base station to the user equipment during a pre-defined time period. Preferably, the status report may include reception acknowledgement information for data blocks which are successfully received from the source base station only. Alternatively, the status report may include acknowledgement information for data blocks which are unsuccessfully received from the source base station only. Here, a data block may be an RLC PDU or an RLC SDU. Generally, a reception acknowledgement by the user equipment is performed by unit of an RLC PDU, but can be performed by unit of an RLC SDU. For example, the user equipment may transmit a reception acknowledgement for each RLC PDU before receiving the handover command message from the source base station but may transmit a reception acknowledgement for each RLC SDU after receiving the handover command message. The reception acknowledgement information can be included in at least one of status PDU or piggyback status PDU to be transmitted.

The status report by the user equipment after receiving the handover command message is needed in order for the user equipment to exactly report, to the source base station, information whether the user equipment successfully receives data blocks transmitted from the source base station. As described above, in general, the user equipment reports, to the source base station, reception acknowledgements for RLC PDUs transmitted from the source base station. However, since an interval between status reports is long, the reception acknowledgement information which the source base station has at the time of handover can be inaccurate. In this case, it is necessary for the user equipment to report exact reception acknowledgement information to the source base station, so that the source base station does not transfer repeated user data to the target base station.

The source base station having received the status report from the user equipment transfers user data to be transmitted to the user equipment to the target base station based on the reception acknowledgement information included in the status report [S63]. The user data to be transferred to the target base station includes data blocks stored in a transmission buffer or a retransmission buffer of the source base station other than a data block which has been successfully transmitted to the user equipment. A data block can be at least one of RLC PDU and RLC SDU. Whether a data block is successfully transmitted to the user equipment can be judged by a reception acknowledgement for the data block. Namely, when receiving a positive reception acknowledgement for a data block, the source base station can determine that the data block has been successfully transmitted to the user equipment.

A data block to be transferred from the source base station to the target base station can be classified into three types.

The first type is a data block which the source base station has transmitted to the user equipment and a negative reception acknowledgement has been received from the user equipment. The UE may transmit a reception acknowledgement for each RLC PDU or RLC SDU. Each RLC PDU contains at least a part of an RLC SDU. The data block can be at least one of RLC PDU or RLC SDU.

The second type is an RLC PDU or an RLC SDU included in a MAC PDU which is unsuccessfully transmitted to the user equipment. Namely, in case that a MAC layer fails to transmit a MAC PDU to the user equipment, RLC PDUs or RLC SDUs associated with the failed MAC PDU should be transferred to the target base station. More particularly, an RLC PDU is transferred from an RLC layer to an MAC layer in a network. The MAC layer forms at least one MAC PDU by using the transferred RLC PDU and then transfers the at least one MAC PDU to a physical layer. The hybrid automatic repeat and request (HARQ) scheme is applied to each MAC PDU to be transmitted to the user equipment. If the MAC layer fails to receive ACK for a MAC PDU within a pre-determined retransmission times, the MAC layer informs the RLC layer of the fact so that the RLC layer can retransmit at least one RLC PDU associated with the MAC PDU.

The third type is a data block which the source base station has received from an upper network entity but has not transmitted to the user equipment.

Figure 6:
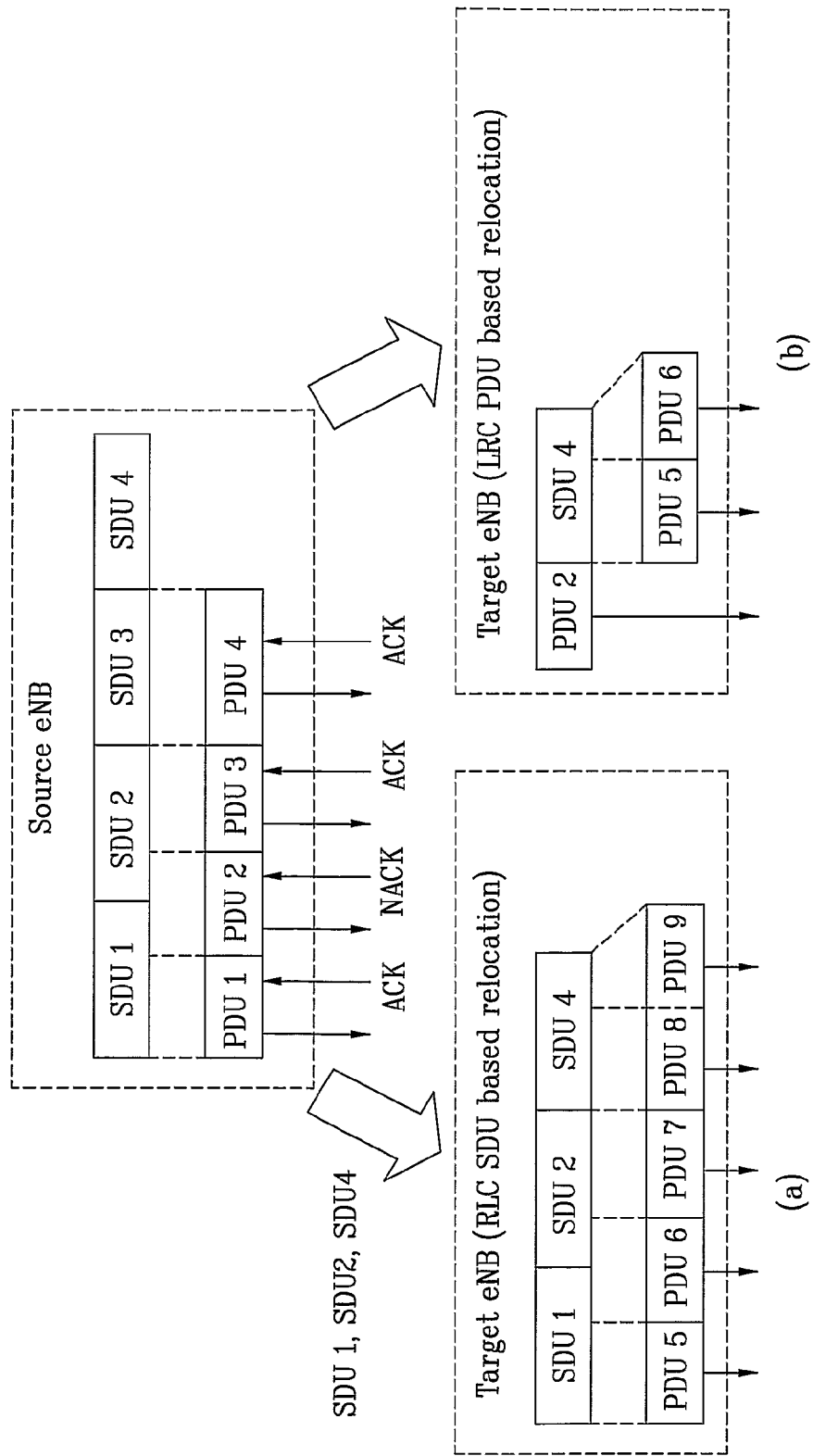
FIG. 6 is a diagram illustrating examples of transferring user data from a source base station to a target base station in accordance with an embodiment of the present invention.

FIG. 6 is a diagram illustrating examples of transferring user data from the source base station to the target base station in accordance with an embodiment of the present invention. Namely, FIG. 6 is a diagram illustrating embodiments of S63 in FIG. 5. FIG. 6(*a*) represents an example for transferring data blocks based on RLC SDUs and FIG. 6(*b*) represents an example for transferring data blocks based on RLC PDUs.

In FIG. 6, the source base station receives RLC SDUs 1, 2, 3, and 4 from an upper network entity (e.g. aGW). The RLC layer of the source base station configures RLC PDUs 1, 2, 3, and 4 by segmenting and/or concatenating the RLC SDUs 1, 2, and 3 and transmits RLC PDUs 1, 2, 3, and 4 to the user equipment. The source base station receives positive reception acknowledgements (hereinafter, 'ACK) for the RLC PDUs 1, 3, and 4 and a negative reception acknowledgement (hereinafter, 'NACK) for the RLC PDU 2. Here, the numbers following RLC SDUs or RLC PDUs represent sequence numbers of the RLC SDUs or the RLC PDUs.

From the mapping relationship between the RLC SDUs and the RLC PDUs which is known to the source base station, the source base station can obtain the fact that the user equipment has received the RLC SDU 3 successfully but has not received the RLC SDUs 1, 2, and 4 successfully. In order for the user equipment to correctly recover the RLC SDUs 1, 2, 3, and 4, all RLC PDUs associated with the RLC SDU 1, 2, 3, and 4 should be successfully transmitted to the user equipment. However, in FIG. 6, the RLC PDU 1, 3, and 4 has been successfully transmitted to the user equipment. The user equipment can recover the RLC SDU 3 by using the successfully transmitted RLC PDU 4. As described above, however, the RLC SDU 1, 2, and 4 cannot be successfully recovered in the user equipment since the RLC PDU 2 fails to be successfully transmitted.

In the embodiment of FIG. 6(*a*), the source base station transfers, to the target base station, RLC SDUs which are transmitted unsuccessfully and are not transmitted to the user equipment yet other than an RLC SDU which is successfully transmitted to the user equipment. Namely, in FIG. 6(*a*), the source base station transfers the RLC SDU 1, 2, and 4 to the target base station. The target base station configures RLC PDUs by using the transferred RLC SDUs and transfers the configured RLC PDUs to the user equipment after the handover is completed. In FIG. 6(a), the source base station does not transfer an RLC SDU which is successfully transmitted to the user equipment.

In the embodiment of FIG. 6(b), the source base station transfers, to the target base station, an RLC PDU for which NACK is received from the user equipment and an RLC SDU which has not been transmitted to the user equipment yet other than an RLC PDU which is successfully transmitted to the user equipment. Namely, the RLC PDU 2 and the RLC SDU 4 are transferred from the source base station to the target base station. The target base station configures the RLC PDUs 5 and 6 by using the transferred RLC SDU 4 and transmits the RLC PDU 2 transferred from the source base station and the configured RLC PDUs 5 and 6 to the user equipment.

In the embodiment of FIG. 6(b), as described above, the source base station transfers to the target base station an RLC PDU which is unsuccessfully transmitted to the user equipment and an RLC SDU which has not been transmitted to the user equipment yet. Accordingly, the source base station does not transfer an RLC SDU and an RLC PDU which are successfully transmitted to the user equipment. The user equipment can recover the RLC SDUs 1, 2, and 3 by combining the RLC PDUs 1, 3, and 4 which are successfully received from the source base station and the RLC PDU 2 which is successfully received from the target base station. In other words, the RLC SDUs 1 and 2 can be recovered by the user equipment based on the RLC PDUs 1 and 3 received from the source base station and the RLC PDU 2 received from the target base station. And, the RLC SDU 3 can be recovered from the RLC PDU 4.

The embodiment of FIG. 6(b) has an advantage, when compared with the embodiment of FIG. 6(a), in that less resources of the target base station are needed for processing user data transferred from the source base station. However, if the target base station has sufficient resources for data processing for the user equipment, the embodiment of FIG. 6(a) may be preferable since implementation in the user equipment can be easily obtained and the user equipment does not have to memorize communication situations with the source base station before the handover.

In other words, one of the embodiments of FIG. 6(a) and FIG. 6(b) can be selected depending on resources which the target base station can use for the user equipment. Since the target base station has an idea of how much resources can be used for the user equipment, the target base station can select one of the embodiments of FIG. 6(a) and FIG. 6(b) and inform the source base station of information associated with the selected one. The source base station may give the user equipment the information through, e.g. the handover command message.

The source base station may perform the handover procedure in accordance with the information from the target base station. In case that the embodiment of FIG. 6(a) is selected, the user equipment may discard all RLC PDUs which are successfully received from the source base station after the handover to the target base station is completed. In case that the embodiment of FIG. 6(b) is selected, it is preferable for the user equipment not to discard all RLC PDUs which are successfully received from the source base station Referring to FIG. 5 again, the target base station which has received, from the source base station, data blocks excluding a data block successfully transmitted to the user equipment among all data blocks for the user equipment stores the received data blocks in a buffer [S64]. The data blocks may include at least one of RLC SDU and RLC PDU.

The user equipment establishes a connection for data communication with the target base station [S65]. The connection establishment procedure may include a synchronization process and a process of establishing necessary radio bearers (RBs). After completing the connection establishment procedure, the target base station allocates uplink radio resources to the user equipment [S66].

The user equipment transmits a handover confirm message through the allocated uplink resources to the target base station [S67]. Preferably, after completing the connection establishment procedure the user equipment transmits to the target base station reception acknowledgement information for data blocks received from the source base station before the handover. In other words, the user equipment informs the target base station of whether a data block is successfully received from the source base station, thereby the target base station can correctly obtain information associated with data blocks to be transmitted to the user equipment after the handover is completed. Preferably, the user equipment may transmit to the target base station reception acknowledgement information for data blocks which are successfully received from the source base station only. Alternatively, the user equipment may transmit to the target base station reception acknowledgement information for data blocks which are unsuccessfully received from the source base station only. The data blocks may include at least one of RLC PDU and RLC SDU. The reception acknowledgement information can be included in the handover confirm message. Alternatively, the reception acknowledgement information can be included in an RLC message, an RRC message or a PDCP message, etc to be transmitted from the user equipment to the target base station.

When receiving user data for the user equipment from the aGW [S68] during the handover, the source base station transfers the received user data to the target base station [S72]. The target base station informs the source base station that the handover is completed [S69] and requests the aGW to update the location of the user equipment [S70]. The aGW performs path switching for the user equipment [S71] and transmits user data to the user equipment via the target base station [S73, S74].

In the embodiments of the present invention, a softer handover by which a user equipment moves between two cells within a coverage of a base station and a soft handover by which a user equipment moves from a cell within a coverage of a base station to other cell within a coverage of other base station should be treated differently.

A couple of cells within a coverage of a base station share establishment information for a user equipment. Reception acknowledgement information received from the user equipment is valid for all cells with the coverage of the base station. In case that the user equipment moves between cells within the coverage of the base station, it is unnecessary for the base station to transfer user data to other base station. Accordingly, the base station can transmit data blocks which have been unsuccessfully transmitted to the user equipment before handover to the user equipment located in a new cell after handover.

On the other hand, in case that the user equipment moves into a new base station, the new base station preferably transmits data blocks which has been unsuccessfully transmitted to the user equipment by the source base station to the user equipment.

Meanwhile, the user equipment has no idea of whether the user equipment moves into a new cell of a new base station or a cell within the coverage of the source base station. Accordingly, when the source base station preferably informs the user equipment of information on whether the cell into which the user equipment moves is within the coverage of the source base station. For example, the information may include an indicator indicating that the user equipment moves into a cell within the coverage of the source base station or a cell within the coverage of new base station. The information can be included in a handover command message to be transmitted to the user equipment.

After receiving the handover command message, the user equipment performs a soft handover or a softer handover in accordance with the information included in the handover command message. Alternatively, the user equipment may determine what kind of handover should be performed according to a base station identifier included in the handover command message. For example, when the base station identifier in the handover command message is a new base station identifier different from an identifier of the source base station, the user equipment performs a soft handover.

During a soft handover procedure, it is preferable for the user equipment to transfer, to an upper layer, an RLC SDU which is successfully received from the source base station but is not transferred yet to the upper layer since other RLC SDU having a lower sequence number than the RLC SDU is unsuccessfully received. Meanwhile, the user equipment may discard an RLC PDU which is successfully received from the source base station.

During a softer handover procedure, it is preferable for the user equipment not to transfer, to an upper layer, an RLC SDU which is successfully received from the source base station but is not transferred yet to the upper layer since other RLC SDU having a lower sequence number than the RLC SDU is unsuccessfully received until the other RLC SDU having a lower sequence number is unsuccessfully received or other events occurs. Meanwhile, the user equipment may not discard an RLC PDU which is successfully received from an old cell within the coverage of the source base station. The user equipment may receive an RLC PDU from a new cell within the coverage of the source base station. In this case, the user equipment can recover RLC SDUs by combining the RLC PDU received from the old cell and the RLC PDU received from the new cell.

Meanwhile, the source base station preferably includes in the handover command message an indicator indicating an operation which the user equipment should perform during handover. The user equipment may perform the following operations in accordance with the indicator.

First, the user equipment transfers, to an upper layer, an RLC SDU which is successfully received from an old cell but which is not transferred yet to the upper layer since other RLC SDU having a lower sequence number than the RLC SDU is unsuccessfully received. Further, the user equipment may discard an RLC PDU which is successfully received from the old cell. In this case, a source base station transfers to a target base station all RLC SDUs which are unsuccessfully received to the user equipment.

Second, the user equipment does not transfer, to an upper layer, an RLC SDU which is successfully received from the source base station but is not transferred yet to the upper layer since other RLC SDU having a lower sequence number than the RLC SDU is unsuccessfully received until the other RLC SDU having a lower sequence number is unsuccessfully received or other events occurs. Further, the user equipment may not discard an RLC PDU which is successfully received from an old cell within the coverage of the source base station. The user equipment may receive an RLC PDU from a new cell within the coverage of the source base station. In this case, the user equipment can recover RLC SDUs by combining the RLC PDU received from the old cell and the RLC PDU received from the new cell.

In other words, the source base station can transmit to the user equipment an indicator indicating whether the user equipment discards an RLC PDU received from the old cell or whether the user equipment delivers an RLC SDU which is successfully received from the old cell to the upper layer. The user equipment can operate in accordance with the indicator.

In the embodiments of the present invention, when the source base station transfers user data to the target base station (S63 in FIG. 5), it is preferable for a virtual data block to be transferred to the target base station, so that the source base station can check whether the target base station receives the user data successfully. For example, in case that the source base station transfers the RLC SDUs 1, 2, and 4 to the target base station, as in the embodiment of FIG. 6(*a*), it is not preferable for the target base station to wait for the RLC SDU 3 without a time limit. To avoid this, the source base station may form an RLC SDU having a sequence number of '3' and transfer to the target base station. The RLC SDU formed by the source base station is the virtual data block. The target base station receiving the virtual data block can realize that a data block corresponding to the sequence number of '3' is not transferred from the source base station.

In this case, it is preferable for the target base station to transmit data blocks transferred from the source base station other than the virtual data block to the user equipment. The virtual data block can be transferred on a channel together with other user data. The virtual data block can inform the target base station that the reception of the virtual data block is unnecessary or that a data block corresponding to the virtual data block will not be transferred.

Some technical terms used in this document can be changed into other terms. For example, a base station and eNode B (or eNB) can be reciprocally exchanged and the base station, eNode B, or eNB can be called a fixed station. Further, a user equipment (UE) can be called a mobile terminal, a terminal, or a user device, etc.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

INDUSTRIAL APPLICABILITY

The present invention is applicable to a wireless communication system like a mobile Internet system or a mobile communication system, etc.

The invention claimed is:
1. A method of supporting handover at a first network entity in a mobile communication system, the method comprising:
    transmitting a plurality of protocol data units (PDUs) of a first layer to a user equipment (UE), the plurality of PDUs comprising a plurality of service data units (SDUs);
    transmitting a handover command message to the UE after determining that the UE will perform handover to a second network entity, which is a target network entity for handover of the UE;

receiving a status report from the UE after transmitting the handover command message, the status report comprising reception acknowledgement information for either each of the plurality of PDUs or each of the plurality of SDUs;

checking whether each of the plurality of PDUs or each of the plurality of SDUs is successfully transmitted to the UE based on the status report;

receiving, from the second network entity, information indicating a selection of either:
- an SDU-based transmission, to the second network entity, of SDUs which the UE failed to receive successfully and SDUs which the first network entity has not transmitted to the UE; or
- a PDU-based transmission, to the second network entity, of PDUs for which negative reception acknowledgements (NACKs) have been received from the UE and SDUs which the first network entity has not transmitted to the UE, wherein the selection at the second network entity of either the SDU-based transmission or the PDU-based transmission depends on an amount of resources which the second network entity can use for the UE; and performing, based on the received information, either the SDU-based transmission of SDUs which the UE failed to receive successfully and SDUs which the first network entity has not transmitted to the UE, or the PDU-based transmission of PDUs for which NACKs have been received from the UE and SDUs which the first network entity has not transmitted to the UE.

2. The method of claim 1, wherein the first layer is a radio link control (RLC) layer having an acknowledged mode (AM) entity.

3. The method of claim 2, wherein the SDUs which the UE failed to receive successfully include a data block for which a NACK is received from the UE.

4. The method of claim 1, wherein the first network entity is a source eNode B (eNB).

5. The method of claim 4, wherein the second network entity is a target eNode B (eNB).

6. The method of claim 1, wherein the first and second network entities have different acknowledged mode (AM) entities.

\* \* \* \* \*